(12) United States Patent
Daub

(10) Patent No.: US 6,300,726 B1
(45) Date of Patent: Oct. 9, 2001

(54) BALLAST FOR HIGH-PRESSURE GAS DISCHARGE LAMP

(75) Inventor: Wolfgang Daub, Anroechte (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/482,093

(22) Filed: Jan. 13, 2000

(30) Foreign Application Priority Data

Jan. 16, 1999 (DE) .............................. 199 01 585

(51) Int. Cl.$^7$ .................................................. H05B 37/02
(52) U.S. Cl. ............................. 315/291; 315/82; 315/308
(58) Field of Search ............................... 315/209 R, 219, 315/224, 225, 291, 247, 307, 308, 82, 80, 77

(56) References Cited

U.S. PATENT DOCUMENTS

| | | | |
|---|---|---|---|
| 4,870,327 | 9/1989 | Jorgensen | 315/307 |
| 5,363,020 | 11/1994 | Chen et al. | 315/209 R |
| 5,481,163 * | 1/1996 | Nokamura et al. | 315/307 |
| 5,880,563 * | 3/1999 | Toyama et al. | 315/225 |
| 5,923,125 * | 7/1999 | Endo | 315/82 |
| 6,008,594 * | 12/1999 | Kita et al. | 315/307 |
| 6,046,551 * | 4/2000 | Kita | 315/307 |

FOREIGN PATENT DOCUMENTS

| | | |
|---|---|---|
| 41 26 865 A1 | 2/1993 | (DE) . |
| 43 31 952 A1 | 3/1995 | (DE) . |
| 0307065A2 | 3/1989 | (EP) . |
| 04 15 496 A2 | 3/1991 | (EP) . |
| 05 43 436 A1 | 5/1993 | (EP) . |
| 08 78 982 A2 | 11/1998 | (EP) . |

* cited by examiner

Primary Examiner—Don Wong
Assistant Examiner—Wilson Lee

(57) ABSTRACT

A ballast for a high-pressure gas discharge lamp of a motor vehicle has: a primary pulsed direct-voltage converter including a conversion transformer, a primary-side converter switch (switching transistor), and a secondary-side rectifier circuit; an H-bridge circuit and an ignition circuit downstream of the direct-voltage converter; a pulse-width modulator whose output signal is applied to a control input of the primary-side convert switch; and a regulator whose output signal value is applied to an input of the pulse-width modulator and determines a pulse width of an output signal generated by the pulse-width modulator. In order to obtain a particularly-reliable ignition of the high-pressure gas discharge lamp, even when an operating voltage is reduced, the regulator controls the pulse width of the output signal generated by the pulse-width modulator as a function of a level of the operating voltage, specifically such that as the operating voltage decreases, an output voltage of the direct-voltage converter is increased.

3 Claims, 1 Drawing Sheet

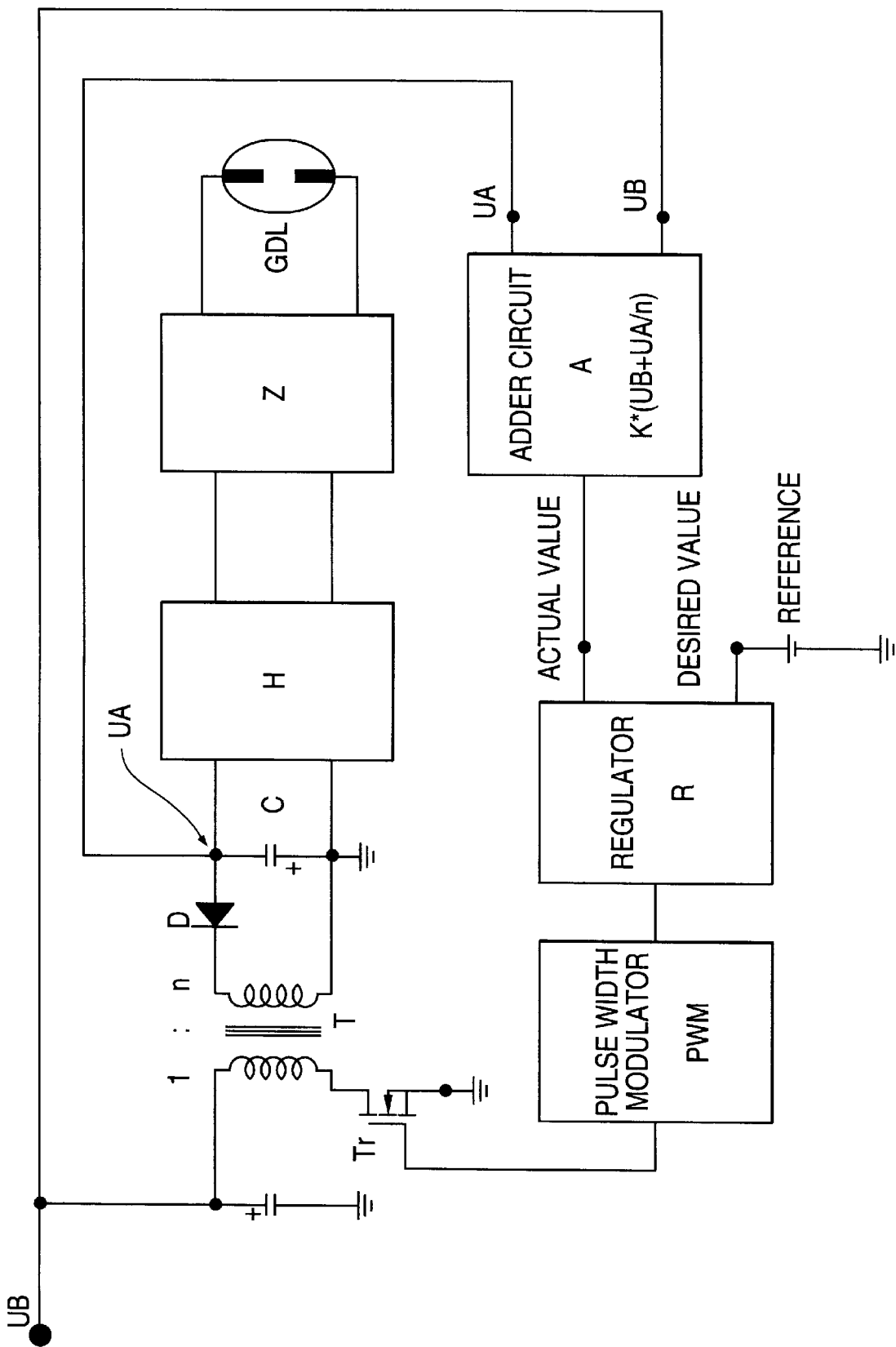

BALLAST FOR HIGH-PRESSURE GAS DISCHARGE LAMP

BACKGROUND OF THE INVENTION

This invention relates to a ballast for a high-pressure gas discharge lamp of a motor vehicle having: a primary pulsed, direct-voltage converter, including a converter transformer, a primary-side converter switch (switching transistor), and a secondary-side rectifier circuit; an H-bridge circuit and an ignition circuit downstream of the direct-voltage converter; a pulse-width modulator, whose output signal is applied to a control input of the primary-side converter switch; and a regulator whose control-signal value is applied to an input of the pulse-width modulator and determines the pulse width of an output signal generated by the pulse-width modulator.

German patent document (DE 41 26 865 A1) discloses a circuit of this type. German patent document (DE 41 26 865 A1) describes a ballast wherein, in an ignition-transition phase, a high-pressure gas discharge lamp is supplied in parallel from a direct-voltage converter and a booster circuit.

In this and similar ballasts, the problem is that a maximum open-circuit output voltage provided by the direct-voltage converter represents a constant value. In a ballast having a direct-voltage converter, this open-circuit output voltage and a maximum output power determine how reliably an ignition spark is transformed into a stable arc discharge upon starting the high-pressure gas discharge lamp. The maximum converter output power depends on the operating voltage (with a limited operating current), and decreases as the operating voltage decreases. The reliability of the transformation of the ignition spark into the stable arc thereby decreases as the converter power decreases. When the operating voltage is reduced, a reliable ignition of the high-pressure gas discharge lamp is no longer assured in every instance.

It is an object of this invention therefore to provide, in an uncomplicated and inexpensive manner, a ballast for a high-pressure gas discharge lamp of a motor vehicle, which provides a particularly reliable ignition of the high-pressure gas discharge lamp even if the ballast is supplied with a reduced operating voltage.

SUMMARY OF THE INVENTION

According to principles of this invention a direct-voltage converter delivers an increasing open-circuit output voltage as a supplied operating voltage decreases.

To accomplish this, a pulse width is controlled as a function of the operating voltage, so that the open-circuit output voltage of the direct-voltage converter is increased when the operating voltage is reduced.

BRIEF DESCRIPTION OF THE DRAWING

The invention is described and explained in more detail below using an embodiment shown in the drawing. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawing. The drawing is not necessarily to scale, emphasis instead being placed upon illustrating principles of the invention in a clear manner.

The sole FIGURE is a basic circuit diagram of a ballast for a high-pressure gas discharge lamp according to the invention.

DESCRIPTION OF THE PREFERRED EMBODIMENT

A circuit has a direct-voltage converter, an output voltage (UA) of which is supplied in an inverted manner to a high-pressure gas discharge lamp (GDL) via an H-bridge circuit (H). A superimposed ignition circuit (Z) connected between the H-bridge circuit (H) and the high-pressure gas discharge lamp (GDL) generates the high voltage required for ignition.

The direct-voltage converter is structured here as a flyback converter having a converter transformer (T), a primary-side switch (switching transistor TR), a secondary-side rectifier circuit (C, D), and control devices (A, R, PWM).

In open-circuit, or quiescent, operation (in a start phase shortly before ignition of the high-pressure gas discharge lamp), the ballast is a direct-voltage converter with a regulated output voltage (UA), but with the output voltage (UA) not being a constant value as is normal in prior-art ballasts, rather being a function of a supplied operating voltage (UB). The switching transformer (Tr) is controlled by the pulse-width modulator (PWM) that controls a pulse width in dependence on a control-signal value from the regulator (R). The control-signal value is derived from a comparison between desired (or set) and actual values, with the desired value being a reference voltage (Reference) that is proportional to a maximum allowable pulsing, or gating, or blocking, bias of the switching transistor (Tr) (or of the rectifier diode D). The regulator (R) ensures that the switching transistor (Tr) is driven with its maximum permissible voltage, indeed independently of the operating voltage (UB). That is, a maximum possible output voltage (UA) is always obtained, with the output voltage (UA), as is desired, being increased as the operating voltage (UB) decreases.

The ballast can be structured, in a particularly uncomplicated manner, such that the regulator (R) generates a control-signal value that is dependent upon a difference between an actual value and the desired value, with the desired value being a constant reference voltage value and the actual value being formed as a function of the output voltage (UA) of the direct-voltage converter and the operating voltage (UB). Additionally, an adder circuit (A) can advantageously be provided that combines the output voltage (UA) of the direct-voltage converter and the operating voltage (UB) according to the equation:

$$\text{Actual value} = K \cdot (UB + UA/n)$$

where
  K: constant factor, and
  n: voltage-conversion ratio of the converter transformer.

In this equation, the sum $UB+UA/n$ corresponds to the voltage at a switched off switching transistor (Tr). The reference voltage (Reference) is accordingly selected such that the maximum gating, or blocking, voltage at the switching transistor (Tr) is never exceeded. The constant K serves to adjust the actual value to the reference voltage (Reference).

The above considerations assume that the maximum blocking voltage of the primary-side switch (switching transistor Tr) is attained before the maximum blocking voltage of the secondary-side diode (D), and thereby represents a critical quantity in the design of the circuit. In an opposite case, a control of the pulse width is accordingly adjusted so that the voltage applied to the diode (D), which is determined according to the equation $n(UB+UA)$, does not exceed the maximum blocking voltage of the diode (D).

By comparing these relationships, it is easily recognized that in this instance, the quantity K must only be modified by a factor of 1/n.

The invention claimed is:

1. A ballast for a high-pressure gas discharge lamp of a motor vehicle having:
- a primary pulsed direct-voltage converter comprising a converter transformer (T), a primary-side converter switch (switching transistor Tr), and a secondary-side rectifier circuit (C,D);
- an H-bridge circuit (H) and an ignition circuit (Z) coupled to the secondary-side rectifier of the direct-voltage converter;
- a pulse-width modulator (PWM), whose output signal is applied to a control input of the primary-side converter switch (Tr); and
- a regulator (R), the control-signal value of which is applied to an input of the pulse-width modulator (PWM) and determines a pulse width of an output signal generated by the pulse-width modulator (PWM);
- wherein the regulator receives a signal indicative of an open-circuit output voltage (UA) of the direct-voltage converter and uses this signal to regulate the pulse width of the output signal generated by the pulse-width modulator (PWM) such that the direct-voltage converter delivers an increasing open-circuit output voltage (UA) as the operating voltage (UB) applied to the direct-voltage converter decreases.

2. A ballast as in claim 1, wherein the regulator (R) generates a control-signal value as a function of a difference between an actual value and a desired value, with the desired value being a constant reference voltage value (Reference) and the actual value being a function of the output voltage (UA) of the direct-voltage converter and the operating voltage (UB).

3. A ballast as in claim 2, wherein an adder (A) combines the output voltage (UA) of the direct-voltage converter and the operating voltage (UB) according to the equation:

$$\text{Actual value} = K \cdot (UB + UA/n)$$

where
- K is a constant factor, and
- n is a voltage-conversion ratio of the converter transformer (T).

* * * * *